United States Patent
Ketels et al.

(10) Patent No.: US 10,391,899 B2
(45) Date of Patent: Aug. 27, 2019

(54) MOTION SICKNESS MITIGATION

(71) Applicant: FAURECIA AUTOMOTIVE SEATING, LLC, Auburn Hills, MI (US)

(72) Inventors: Cedric Ketels, Holland, MI (US); Rod Goodrich, Watervliet, MI (US); Matthew K. Benson, Holland, MI (US); Alfred H. Bransdorfer, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 75 days.

(21) Appl. No.: 15/852,880

(22) Filed: Dec. 22, 2017

(65) Prior Publication Data

US 2019/0193611 A1    Jun. 27, 2019

(51) Int. Cl.
   *B60N 2/42*    (2006.01)
   *B60N 2/50*    (2006.01)
   *B60N 2/02*    (2006.01)

(52) U.S. Cl.
   CPC ...... *B60N 2/502* (2013.01); *B60N 2002/0204* (2013.01)

(58) Field of Classification Search
   CPC ............ B60N 2002/0212; B60N 2/501; B60N 2/502; B60N 2002/022; B60N 2/0244; B60N 2/14; B60N 2/39; B60N 2002/0208; B60N 2/42736
   See application file for complete search history.

(56) References Cited

U.S. PATENT DOCUMENTS

| | | |
|---|---|---|
| 3,144,695 A | 8/1964 | Budwig |
| 3,341,903 A | 9/1967 | Buntic |
| 3,632,076 A | 1/1972 | Rogers, Jr. |
| 4,324,414 A * | 4/1982 | Wilkes ............... A61G 5/006 180/7.1 |
| 4,432,525 A | 2/1984 | Duvall |
| 4,500,062 A | 2/1985 | Sandvik |
| 4,515,337 A | 5/1985 | Torras |
| 4,685,730 A | 8/1987 | Linguanotto |
| 4,869,554 A | 9/1989 | Abu-Isa |
| 4,883,320 A | 11/1989 | Izumida |
| 5,013,086 A * | 5/1991 | Benzur ............... A47D 9/02 297/133 |

(Continued)

FOREIGN PATENT DOCUMENTS

| CN | 1618654 | 5/2005 |
|---|---|---|
| CN | 101274604 | 10/2008 |

(Continued)

OTHER PUBLICATIONS

Office Action dated Feb. 15, 2019 for U.S. Appl. No. 15/856,341 (pp. 1-10).

(Continued)

*Primary Examiner* — Shin H Kim

(74) *Attorney, Agent, or Firm* — Barnes & Thornburg LLP

(57) ABSTRACT

An occupant support adapted for use in a vehicle includes a seat mount, a seat, and a motion-sickness mitigation system. The seat mount is adapted to couple to the vehicle for movement with the vehicle. The seat is adapted to provide a comfortable support surface for an occupant of the occupant support.

20 Claims, 6 Drawing Sheets

(56) References Cited

U.S. PATENT DOCUMENTS

| | | | |
|---|---|---|---|
| 5,368,118 A * | 11/1994 | Hoefle | B62D 33/0604 |
| | | | 180/89.12 |
| 5,393,126 A | 2/1995 | Boulva | |
| 5,558,399 A * | 9/1996 | Serber | B60N 2/4221 |
| | | | 297/216.1 |
| 5,582,381 A | 12/1996 | Graf | |
| 5,769,490 A | 6/1998 | Falzon | |
| 5,976,097 A | 11/1999 | Jensen | |
| 5,992,933 A | 11/1999 | West | |
| 6,068,280 A | 5/2000 | Torres | |
| 6,793,289 B2 | 9/2004 | Kuster | |
| 6,814,407 B2 | 11/2004 | Mundell | |
| 7,044,553 B2 | 5/2006 | Ropp | |
| 7,063,386 B2 | 6/2006 | Dowty | |
| 7,083,233 B2 | 8/2006 | Massara | |
| 7,281,749 B2 | 10/2007 | Yamada | |
| 7,334,758 B2 * | 2/2008 | Williamson | B64D 11/0696 |
| | | | 244/118.6 |
| 7,338,126 B2 | 3/2008 | Ropp | |
| 7,481,493 B2 | 1/2009 | Fujita | |
| 7,490,572 B2 | 2/2009 | Grober | |
| 7,506,910 B2 | 3/2009 | Leitner | |
| 7,517,024 B2 | 4/2009 | Cvek | |
| 7,575,206 B2 | 8/2009 | Meier | |
| 7,722,526 B2 | 5/2010 | Kim | |
| 7,731,294 B2 | 6/2010 | Yasuda | |
| 7,841,662 B2 | 11/2010 | Samain | |
| 7,971,939 B2 | 7/2011 | Fujita | |
| 8,020,933 B2 | 9/2011 | Kim | |
| 8,100,471 B2 | 1/2012 | Lawall | |
| 8,340,869 B2 * | 12/2012 | Wakita | A61G 5/04 |
| | | | 701/41 |
| 8,662,585 B2 | 3/2014 | Garvis | |
| 8,684,460 B2 | 4/2014 | Weir, III | |
| 8,690,750 B2 | 4/2014 | Krueger | |
| 8,840,186 B2 | 9/2014 | Samain | |
| 8,911,015 B2 | 12/2014 | Cohen | |
| 9,045,058 B2 | 6/2015 | Katoh | |
| 9,193,280 B2 | 11/2015 | McMillen | |
| 9,193,287 B2 | 11/2015 | McMillen | |
| 9,242,581 B2 | 1/2016 | Farooq | |
| 9,272,643 B2 | 3/2016 | Nagayasu | |
| 9,428,083 B2 | 8/2016 | Lehner | |
| 9,494,940 B1 | 11/2016 | Kentley | |
| 9,517,777 B2 | 12/2016 | Hall | |
| 9,550,440 B2 | 1/2017 | Nagayasu | |
| 9,561,741 B2 | 2/2017 | Nagayasu | |
| 9,604,560 B1 | 3/2017 | Ellis | |
| 9,682,682 B2 | 6/2017 | Aoki | |
| 9,713,380 B2 | 7/2017 | Gehner | |
| 9,751,434 B2 | 9/2017 | Sugiyama | |
| 9,802,513 B2 | 10/2017 | Katoh | |
| 9,950,646 B2 | 4/2018 | Katoh | |
| 9,975,458 B2 | 5/2018 | Takeuchi | |
| 2002/0060493 A1 | 5/2002 | Nishino | |
| 2002/0135214 A1 | 9/2002 | Ursel | |
| 2003/0116999 A1 | 6/2003 | Fujita | |
| 2004/0245824 A1 | 12/2004 | McMillen | |
| 2005/0179294 A1 | 8/2005 | Dowty | |
| 2006/0055214 A1 * | 3/2006 | Serber | B60N 2/0745 |
| | | | 297/216.1 |
| 2006/0138831 A1 | 6/2006 | McMillen | |
| 2007/0080013 A1 | 4/2007 | Melz | |
| 2008/0023995 A1 * | 1/2008 | Ott | B60N 2/0252 |
| | | | 297/284.1 |
| 2009/0115234 A1 | 5/2009 | Samain | |
| 2010/0268133 A1 | 10/2010 | Samain | |
| 2013/0175838 A1 | 7/2013 | Oshima | |
| 2015/0105641 A1 | 4/2015 | Austin | |
| 2015/0266448 A1 | 9/2015 | Aoki | |
| 2015/0343924 A1 | 12/2015 | Takeuchi | |
| 2016/0096450 A1 | 4/2016 | Kondrad | |
| 2016/0159254 A1 | 6/2016 | Katoh | |
| 2016/0243967 A1 | 8/2016 | Seibold | |
| 2017/0129373 A1 * | 5/2017 | Knox | B60N 2/10 |
| 2018/0222518 A1 * | 8/2018 | Hill | B60N 2/0244 |

FOREIGN PATENT DOCUMENTS

| | | |
|---|---|---|
| CN | 104758153 | 7/2015 |
| DE | 10041910 | 1/2002 |
| DE | 102004058503 | 1/2006 |
| DE | 102009048902 | 4/2011 |
| DE | 102011109470 | 2/2012 |
| DE | 102011009211 A1 | 7/2012 |
| DE | 102015117980 | 5/2016 |
| EP | 0185388 A1 | 6/1986 |
| EP | 1193117 | 4/2002 |
| EP | 1663727 | 6/2006 |
| FR | 2061931 | 6/1971 |
| FR | 2776583 | 10/1999 |
| GB | 1330683 A | 9/1973 |
| GB | 2206787 | 1/1989 |
| GB | 2206787 B | 1/1989 |
| GB | 2407028 | 4/2005 |
| GB | 201307595 | 6/2013 |
| JP | 2003299231 A | 10/2003 |
| WO | 2004026080 | 4/2004 |
| WO | 2005025945 | 3/2005 |
| WO | 2005037020 | 4/2005 |
| WO | 2005094632 | 10/2005 |
| WO | 2006083158 | 8/2006 |
| WO | 2006095455 A1 | 9/2006 |
| WO | 2016197068 | 12/2016 |

OTHER PUBLICATIONS

Extended European Search Report for European App. No. 17206306.7 dated May 14, 2018, 4175 EP II, 5 pages.

German Office Action for German App. No. 10 2016 123 681.0 dated Oct. 19, 2017, 601-666 DE, 5 pages, (no English translation available).

Office Action dated Apr. 19, 2019 for U.S. Appl. No. 15/852,010, pp. 1-6.

* cited by examiner

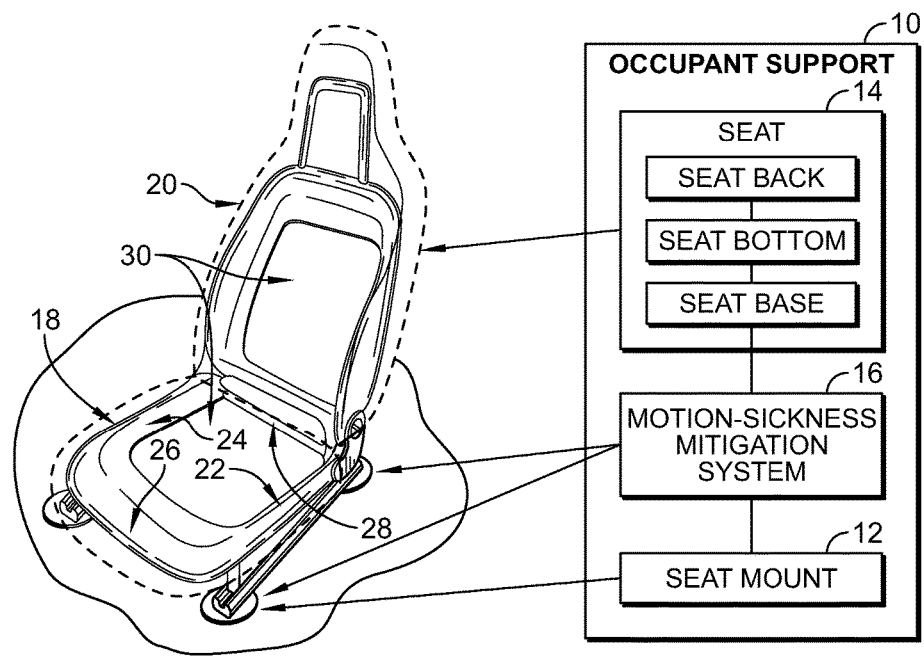
FIG. 1
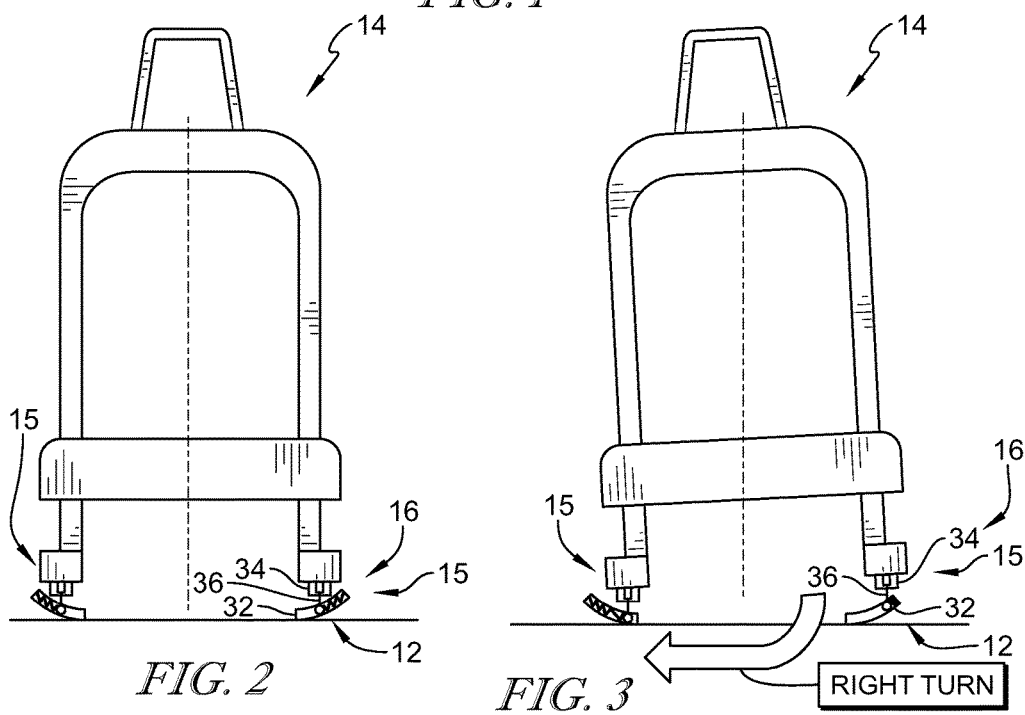
FIG. 2
FIG. 3
RIGHT TURN

MOTION SICKNESS MITIGATION

BACKGROUND

The present disclosure relates to occupant supports, and particularly to occupant supports including a seat. More particularly, the present disclosure relates to occupant supports configured for use in vehicles.

SUMMARY

According to the present disclosure, an occupant support includes a seat mount and a seat. The seat mount is coupled to a floor of a vehicle for movement with the vehicle. The seat includes a seat bottom coupled to the seat mount and a seat back coupled to the seat bottom. The seat bottom and the seat back provide a support surface to support an occupant in the vehicle.

In illustrative embodiments, the occupant support further includes a motion-sickness mitigation system coupled to the seat between the seat mount and the seat bottom. The motion-sickness mitigation system is configured to provide means for facilitating movement of the seat relative to the seat mount in response to an acceleration of the seat mount. The motion-sickness mitigation system is configured to reduce acceleration of the occupant during acceleration of the vehicle so that motion sickness experienced by the occupant is mitigated, remedied, or prevented.

In illustrative embodiments, the motion-sickness mitigation system includes a first guide rail, a second guide rail, and a slide unit extending between the first and second guide rails. The first guide rail defines a laterally extending path relative to the seat bottom. The second guide rail defines a fore-and-aft path relative to the seat bottom. The slide unit is configured to allow the seat to move along one or both of the paths simultaneously in response to the acceleration of the seat mount so that a magnitude of the acceleration of the seat is minimized.

In illustrative embodiments, the slide unit includes a first roller coupled to the first guide rail, a second roller coupled to the second guide rail, and a shaft extending between the first and second rollers. The rollers are configured to move along the laterally extending path and the fore-and-aft extending path, respectively, as the seat moves relative to the seat mount in response to the acceleration of the seat mount including change in direction of the seat mount.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an occupant support in accordance with the present disclosure showing that the occupant support includes a seat mount coupled to a floor of a vehicle, a seat coupled to the seat mount for movement with the seat mount and vehicle, and a motion-sickness mitigation system coupled between the seat mount and the seat to allow relative movement between the seat and the seat mount;

FIGS. 2 and 3 are a series of front elevation views of the occupant support of FIG. 1 showing that the motion-sickness mitigation system includes a lower curvilinear guide rail, an upper curvilinear guide rail, and a slide unit extending from the lower curvilinear guide rail to the upper curvilinear guide rail and showing that the motion-sickness mitigation system is coupled to the seat mount such that the seat is movable in response to an acceleration of the seat mount from an equilibrium state as shown in FIG. 2 to a dampened state as shown in FIG. 3;

FIG. 2 is a front elevation view of the occupant support of FIG. 1 showing the seat arranged in the equilibrium state prior to any forces acting on the occupant support;

FIG. 3 is a front elevation view of the occupant support of FIG. 1 showing an acceleration applied to the seat mount due to the occupant support taking a right turn such that the seat moves to the dampened state in which the motion-sickness mitigation system dampens inertial forces acting on the seat as the seat move relative to the seat mount;

DETAILED DESCRIPTION

Figure 4:
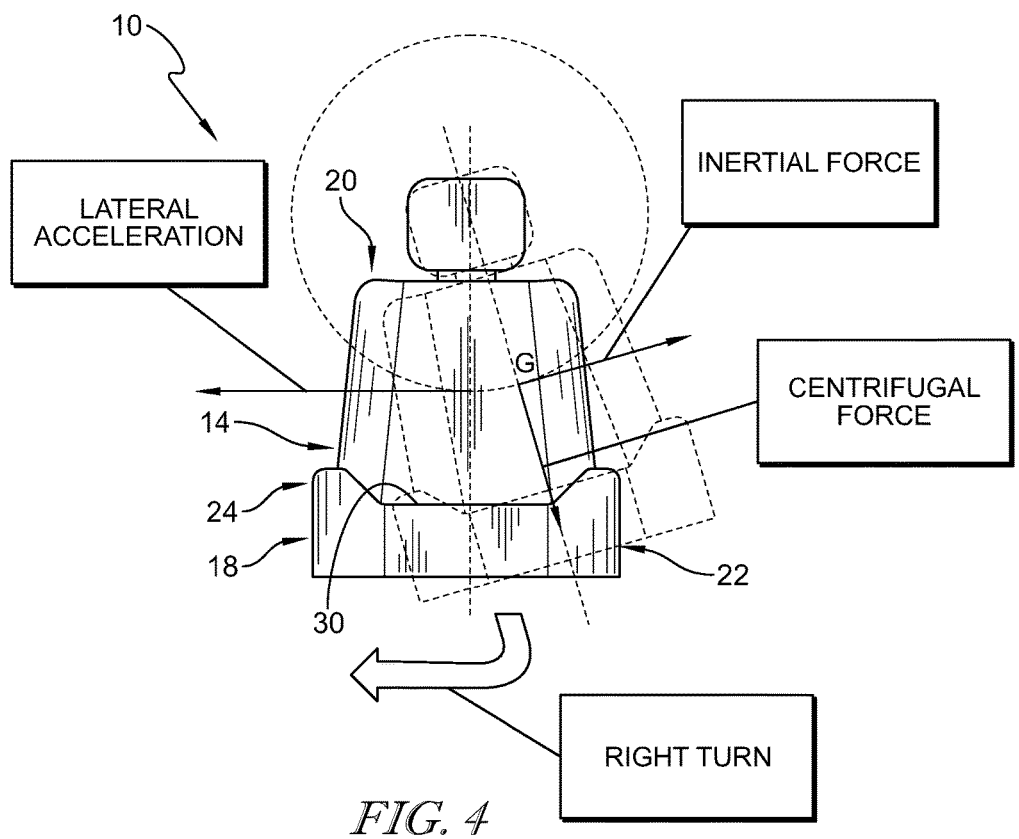
FIG. 4 is a front elevation and diagrammatic view of the occupant support taking a right turn and showing that the occupant support has a lateral acceleration in the direction of the turn, an inertial force in a direction generally opposite of the lateral acceleration, and a centrifugal force in a downward direction generally perpendicular to the inertial force.

An occupant support 10 adapted for use in a vehicle is shown in FIGS. 1-3. The occupant support 10 is configured to minimize motion sickness of an occupant supported by the occupant support 10 by dampening acceleration of the occupant when the occupant support 10 accelerates.

In accordance with the present disclosure, motion sickness may be minimized by reducing acceleration forces experienced by the occupant due to vehicle motion in the fore-and-aft and lateral directions. The occupant support 10 allows the occupant to move slightly laterally and/or fore and aft to more closely match the motion of the vehicle, as suggested in FIGS. 2 and 3, instead of remaining relatively static. As a result, the acceleration and inertial forces experienced by the occupant are reduced. This may also be referred to as G-force dampening. Motion sickness may result from a discrepancy between what our eyes perceive compared to what our body experiences (biological accelerometers: vestibular system, somatic, visceral).

The occupant support 10 includes a seat 14, a seat mount 12 and a motion-sickness mitigation system 16 as shown in FIG. 1. The seat mount 12 is adapted to couple with a floor of the vehicle for movement with the vehicle. The seat 14 is coupled with the seat mount 12 for movement with the seat mount 12. The motion-sickness mitigation system 16 facilitates relative movement of the seat 14 relative to the seat mount 12 in response to an acceleration of the seat mount 12. The motion-sickness mitigation system 16 may be configured to reduce inertial forces experienced by the seat 14 and the occupant during acceleration of the seat mount 12 so that motion sickness experienced by the occupant is minimized as suggested in FIGS. 2 and 3.

The seat mount 12 is configured to couple the occupant support 10 to the vehicle as suggested in FIG. 1. In the illustrative embodiment, the seat mount 12 is integrated with the vehicle floor. In some embodiments, the seat mount 12 includes the vehicle floor. In other embodiments, the seat mount 12 is coupled to a frame. The seat mount 12 moves with the vehicle such that acceleration of the vehicle is applied to the seat mount 12.

The seat 14 includes a seat bottom 18 and a seat back 20 as shown in FIGS. 1-3. The seat bottom 18 is adapted to support thighs of the occupant and the seat back 20 is adapted to support the back and shoulders of the occupant. The seat bottom 18 includes a left lateral side 22, a right lateral side 24 spaced apart from left lateral side 22, a fore end 26, and an aft end 28 spaced apart from fore end 26. The seat back 20 is arranged to extend upwardly and away from the aft end 28 of the seat bottom 18.

The seat bottom 18 and the seat back 20 cooperate to define a support surface 30 adapted to support the occupant of the occupant support 10 thereon. The support surface 30 is defined by a trim of the seat 14 in the illustrative embodiment. The support surface 30 is configured to move with the seat 14 relative to the seat mount 12 to mitigate motion sickness. The support surface 30 may move relative to the seat mount 12 due to movement of seat bottom 18 and the seat back 20. The support surface 30 may move relative to the seat mount 12 in response to movement of the support surface 30 relative to the seat bottom 18 and the seat back 20, for example, due to an adjustable seat cushion.

The motion-sickness mitigation system 16 is configured to provide motion-sickness mitigation means. The motion-sickness mitigation means facilitates relative movement between the seat 14 and the seat mount 12 in response to an acceleration of the seat mount 12 to reduce a magnitude of at least one of lateral acceleration and fore-and-aft acceleration of the occupant during acceleration of the seat mount 12 so that motion sickness experienced by the occupant is minimized. In some embodiments, the motion-sickness mitigation means reduces vibrations of about 0.2 to about 0.4 Hertz. In some embodiments, motion-sickness mitigation means 10 reduces accelerations of about 0.1 to about 0.5 Hertz.

Figure 5:
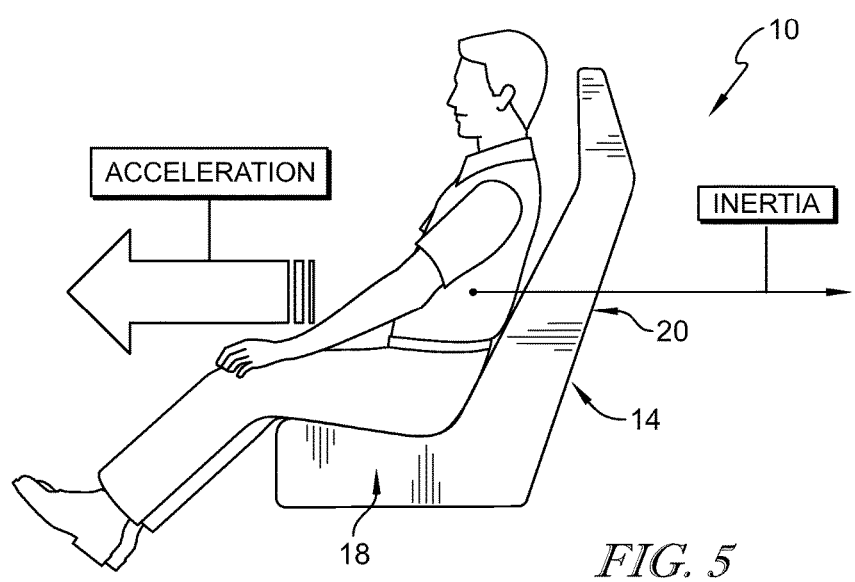
FIG. 5 is a side elevation and diagrammatic view of the occupant support of FIG. 1 suggesting that when the occupant support has a forward acceleration it also has an inertial force that is generally opposite to the forward acceleration.

Acceleration of the vehicle is applied to the occupant through the occupant support 10 as suggested in FIGS. 4 and 5. During a vehicle acceleration event, the momentum of the occupant resists the acceleration as suggested in FIGS. 4 and 5. This may cause the occupant to feel a pressure of their body acting against the seat 14. The motion-sickness mitigation means of the present disclosure allows pendulum like movement of the seat 14 and the occupant relative to the seat mount 12 to reduce the magnitude of the acceleration felt by the occupant.

The motion-sickness mitigation means of the present disclosure allows movement of the seat 14 and the occupant relative to the seat mount 12 to extend an amount of time forces are applied to the occupant. The motion-sickness mitigation system 16 dampens inertial forces to reduce the magnitude of the acceleration felt by the occupant as the seat mount 12 accelerates in a direction and/or changes its direction of travel. The acceleration may be a negative acceleration (sometimes called deceleration).

The motion-sickness mitigation system 16 includes a lower curvilinear guide rail 32, an upper curvilinear guide rail 34, and a slide unit 36 as shown in FIGS. 2 and 3. The lower curvilinear guide rail 32 is coupled to the seat mount 12 and provides a lower curvilinear path. The upper curvilinear guide rail 34 is coupled to seat bottom 18 and provides an upper curvilinear path. The lower curvilinear guide rail 32 may be spaced apart from the upper curvilinear guide rail 34. The slide unit 36 extends between the lower curvilinear guide rail 32 and the upper curvilinear guide rail 34. In other embodiments, one or both guide rails 32, 34 define linear paths.

The slide unit 36 cooperates with the upper and lower curvilinear guide rails 32, 34 to allow side-to-side and fore-and-aft rotational movement of the seat 14 along the lower and upper curvilinear paths in response to an acceleration and/or change of direction of the seat mount 12. In the illustrative embodiment, the slide unit 36 cooperates with the guide rails 32, 34 to allow rotation of the seat 14 relative to the seat mount 12 along the curvilinear paths in any and all directions. In other embodiments, the rails 32, 34 are linear and define linear paths.

The lower curvilinear path is arranged to extend in a first and second direction. The upper curvilinear path is arranged to extend in a third and fourth direction. The seat 14 rotates laterally in the first and second directions relative to the seat mount 12. The seat rotates fore-and-aft in the third and fourth directions. The first and second directions are generally perpendicular to the third and fourth directions. In one example, the seat 14 may rotate in one of the first and second directions while rotating in one of the third and fourth directions.

In the illustrative embodiment, the motion-sickness mitigation system 16 includes a plurality of motion controllers 15 (also called sets) having at least one upper and one lower curvilinear guide rail. A motion controller 15 is located at each corner of the seat bottom 18 in the illustrative embodiment. However, any suitable number of motion controllers 15 may be included in motion-sickness mitigation system 16 such as, for example, a single motion controller 15 located in a generally central location under seat bottom 18.

Figure 6:
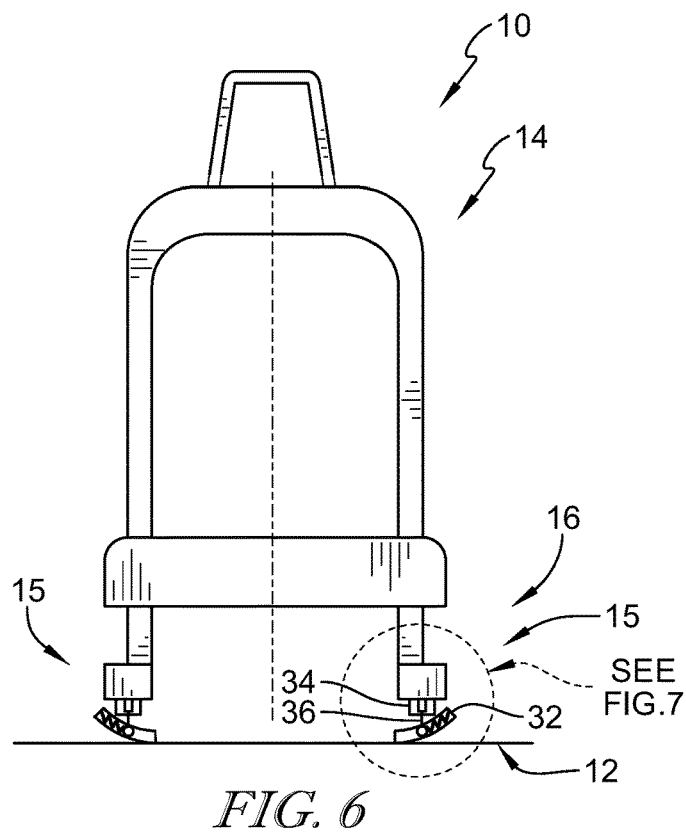
FIG. 6 is a diagrammatic view of the occupant support of FIG. 1 showing that the lower curvilinear guide rail is arranged generally perpendicular to the upper curvilinear guide rail and showing that a biasing member is coupled to the lower curvilinear guide member and slide unit to maintain the motion-sickness mitigation system in the equilibrium state prior to any forces acting on the occupant support.
Figure 7:
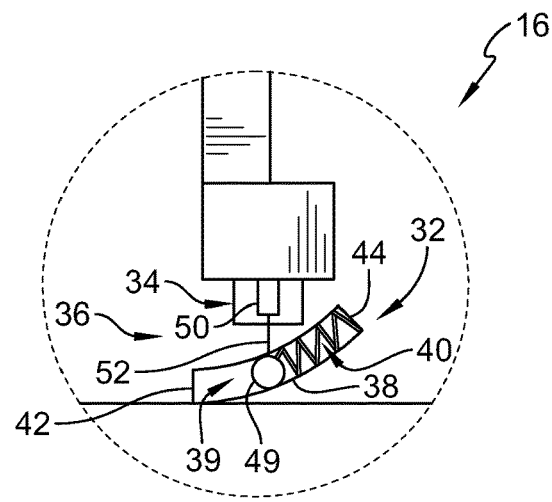
FIG. 7 is an enlarged view of the motion mitigation system of FIG. 6 showing that the slide unit includes a first roller, a second roller, and a shaft extending from the first roller to the second roller and showing that the first roller is coupled to the lower curvilinear guide rail for side-to-side movement relative to the seat bottom.

The lower curvilinear guide rail 32 is arranged generally perpendicular to the upper curvilinear guide rail 34 and extends laterally relative to the seat bottom 18 as shown in FIGS. 6 and 7. The lower curvilinear guide rail 32 includes a housing 38 and a biasing member 40. The housing 38 includes a first end 42 and a second end 44 and forms a generally curved shape of curvilinear guide rail 32 between the first and second ends 42, 44. The housing 38 is formed to include an internal space 39 defined between the first and second ends 42, 44. The internal space 39 is shaped to receive at least a portion of slide unit 36 and allows movement of the slide unit 36 between the first and second ends 42, 44. The biasing member 40 is arranged to lie within the internal space 39 and extends between the slide unit 36 and the second end 44 of the housing 38.

Figure 8:
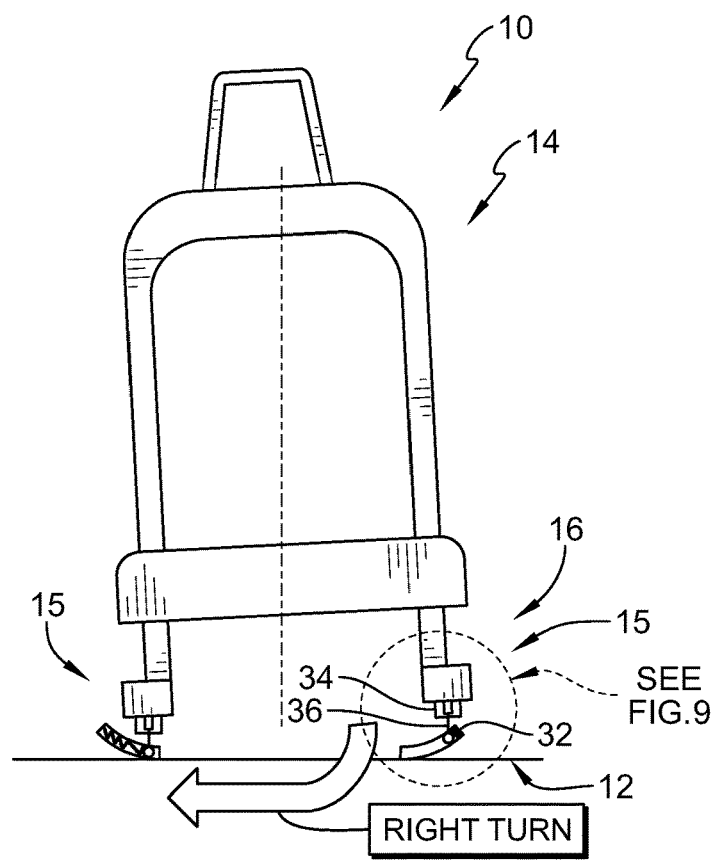
FIG. 8 is a diagrammatic view similar to FIG. 6 showing the occupant support taking a right turn and showing that the seat pivots relative to the seat mount and the motion-sickness mitigation system dampens inertial forces acting on the seat during the right turn so that motion sickness is minimized.
Figure 9:
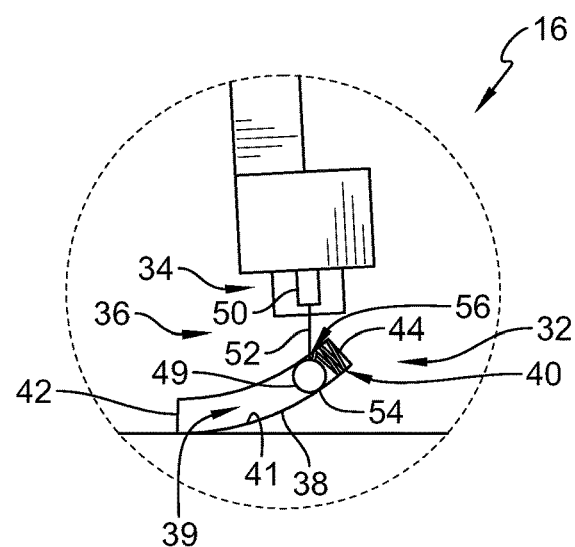
FIG. 9 is an enlarged diagrammatic view of the motion-sickness mitigation system of FIG. 8 showing that the first roller travels along the lower curvilinear guide rail and compresses the biasing member as the seat mount takes the right turn to dampen inertial forces acting on the seat during the right turn.

In the illustrative embodiment, the biasing member 40 is configured to maintain the motion-sickness mitigation system 16 in an equilibrium state as shown in FIGS. 2, 6, and 7. The motion-sickness mitigation system 16 moves to a dampened state to reduce inertial forces experienced by the seat 14 and the occupant as the occupant support 10 takes a turn as shown in FIGS. 3, 8, and 9. The biasing member 40 regulates movement of the seat 14 relative to the seat mount 12 by resisting movement of the slide unit 36 within the housing 38 as the motion-sickness mitigation system 16 moves to the dampened state.

The biasing member 40 compresses or expands depending on the direction of the turn or the direction of acceleration of the occupant support 10 to regulate movement of the motion-sickness mitigation system 16 as shown in FIGS. 8 and 9. For example, the biasing member 40 is compressed by the slide unit 36 as the seat 14 moves during a right turn. The biasing member 40 is expanded by the slide unit 36 as the seat 14 moves during a left turn.

Figure 10:
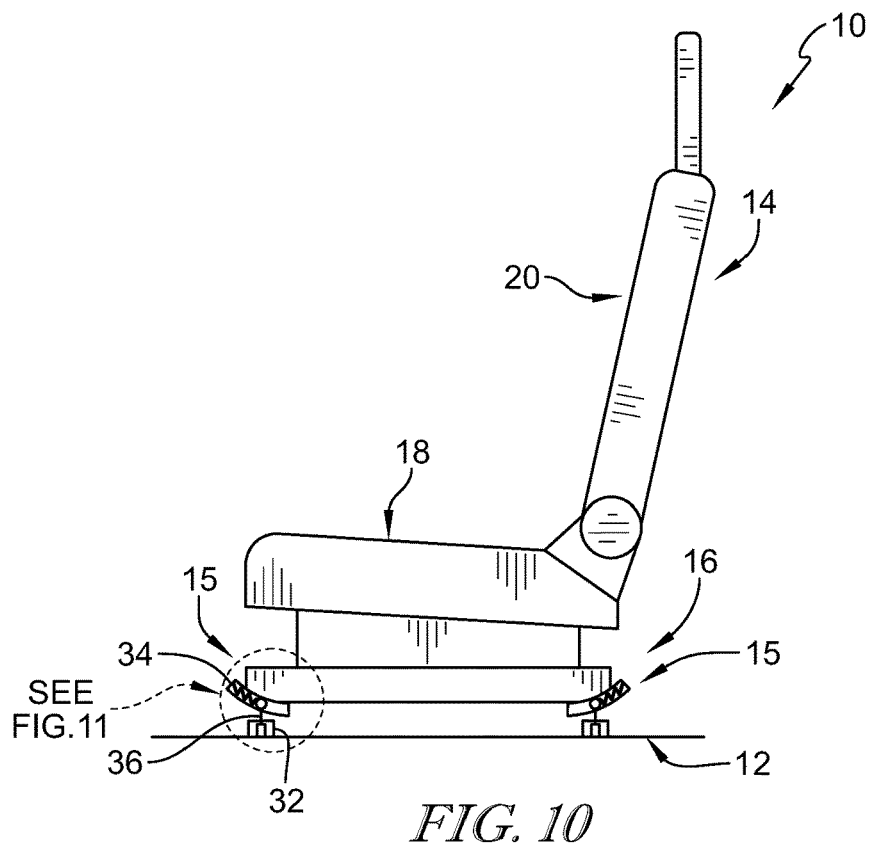
FIG. 10 is a diagrammatic view of the occupant support showing that the upper curvilinear guide rail is arranged generally perpendicular to the lower curvilinear guide rail and showing that a biasing member is coupled to the upper curvilinear guide member and the slide unit to maintain the motion-sickness mitigation system in the equilibrium state prior to any forces acting on the occupant support.
Figure 11:
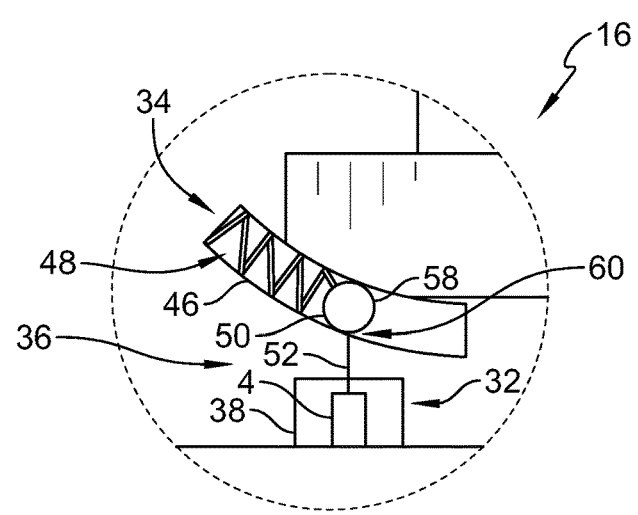
FIG. 11 is an enlarged view of the motion mitigation system of FIG. 10 showing that the second roller is coupled to the upper curvilinear guide rail for forward-and-backward movement relative to the seat bottom.

The upper curvilinear guide rail 34 is located above the lower curvilinear guide rail 32 and extends fore and aft relative to the seat bottom 18 as shown in FIGS. 10 and 11. The upper curvilinear guide rail 34 includes a housing 46 and a biasing member 48. The housing 46 is similar to the housing 38 except that the housing 46 is arranged generally perpendicular to the housing 38 to allow fore and aft movement of the slide unit 36 within housing 46. The biasing member 48 is similar to the biasing member 40 except that the biasing member 48 is configured to dampen fore-and-aft movement of the seat 14 as the occupant support 10 accelerates or decelerates as suggested in FIGS. 12 and 13.

The lower guide rails 32 of each motion controller 15 cooperate with one another to dampen inertial forces as the occupant support 10 makes left and right turns as shown in FIG. 8. For example, the biasing member 40 in one lower guide rail 32 may compress during a right turn while the biasing member 40 in another lower guide rail 32 expands. Similarly, the upper guide rails 34 of each motion controller 15 cooperate with one another by compressing and expanding respective biasing members 48 as the occupant support 10 accelerates. Additionally, the lower guide rails 32 and the upper guide rails 34 of each motion controller 15 cooperate with one another to expand and compress respective biasing members when the seat 14 moves in a direction other than laterally or fore-and-aft.

Figure 12:
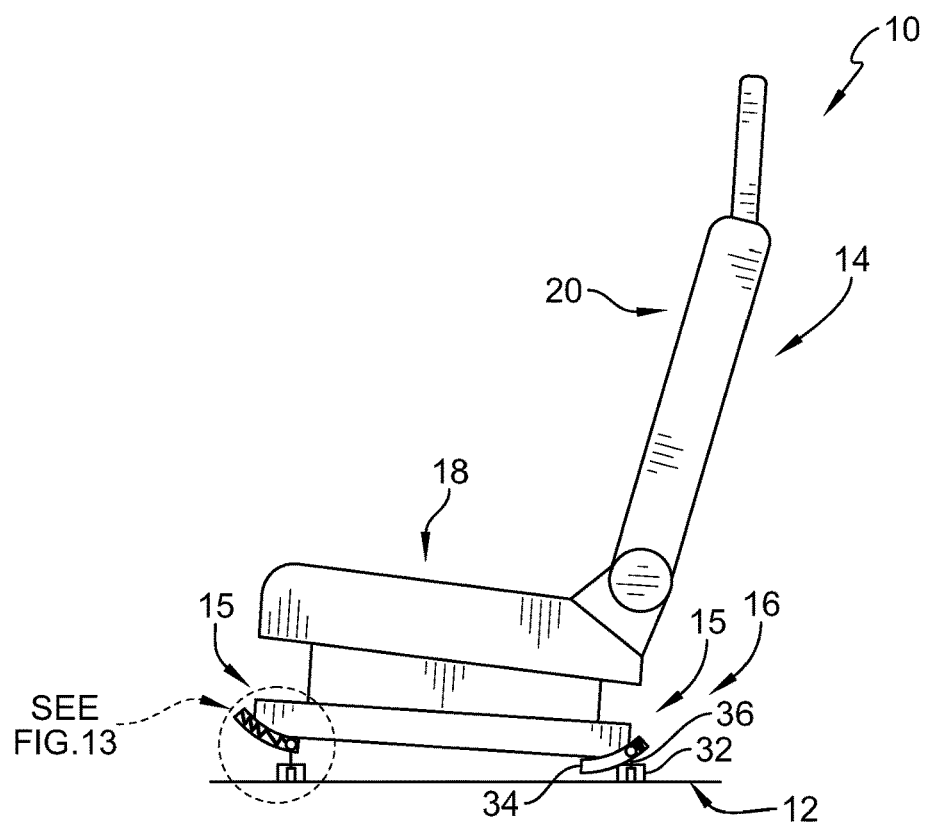
FIG. 12 is a diagrammatic view similar to FIG. 10 showing the occupant support accelerating in a forward direction and showing that the seat pivots relative to the seat mount so that the motion-sickness mitigation system dampens inertial forces acting on the seat during the forward acceleration and motion sickness is minimized.
Figure 13:
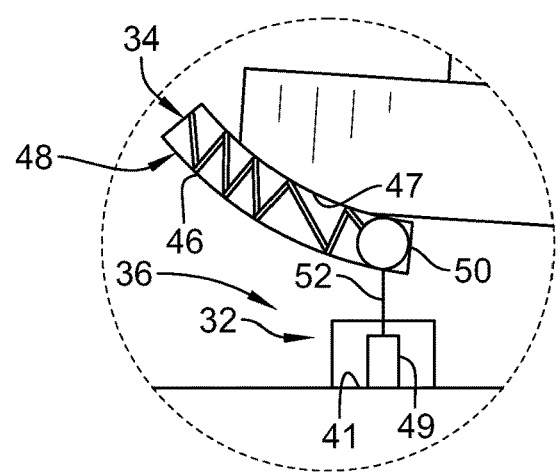
FIG. 13 is an enlarged diagrammatic view of the circled portion of the occupant support in FIG. 12 showing that the second roller travels along the upper curvilinear guide rail and extends the biasing member as the seat mount accelerates in the forward direction.

The slide unit 36 is configured to move within the housings 38, 46 as the occupant support makes a turn as shown in FIGS. 8 and 9 or accelerates as shown in FIGS. 11 and 12. The slide unit 36 includes a lower roller 49, an upper roller 50, and a shaft 52. The lower roller 49 is arranged to lie within the housing 38 of the lower curvilinear guide rail 32. The upper roller 50 is arranged to lie within the housing 46 of the upper curvilinear guide rail 34. The shaft 52 is coupled to the lower and upper rollers 49, 50 for movement with the rollers.

The lower roller 49 is arranged to engage a lower surface 41 of the housing 38 as shown in FIG. 9. The lower roller 49 includes a bearing 54, and a mount 56. The bearing 54 is configured to travel along the lower surface of the housing 38 as the motion-sickness mitigation system 16 moves from the equilibrium state to the dampened state in response to a turn or a change in acceleration. The mount 56 couples the bearing 54 to the shaft 52. In some embodiments, the mount 56 engages the biasing member 40. In other embodiments, the biasing member 40 engages the bearing 54.

The upper roller 50 is arranged to engage an upper surface 47 of the housing 46 as shown in FIG. 11. The upper roller 50 includes a bearing 58, and a mount 60. The bearing 58 is configured to travel along the upper surface 47 of the housing 46 as the motion-sickness mitigation system 16 moves from the equilibrium state to the dampened state in response to a turn or a change in acceleration. The mount 60 couples the bearing 58 to the shaft 52. In some embodiments, the mount 60 engages the biasing member 40. In other embodiments, the biasing member 40 engages the bearing 58.

In the illustrative embodiment, the lower curvilinear guide rails 32 included in the front sets of motion-sickness mitigation system 16 are arranged to lie on the same plane. Additionally, the lower curvilinear guide rails 32 included in the front sets of motion-sickness mitigation system 16 are arranged to lie on the same curve such that they share a common origin relative to one another. Similarly, the lower curvilinear guide rails 32 included in the rear sets of motion-sickness mitigation system 16 are also arranged to lie on the same plane and curve such that they share a common origin relative to one another. However, in other embodiments, front and rear lower guide rails may not be arranged to lie on the same plane and curve nor share a common origin, respectively.

In the illustrative embodiment, the upper curvilinear guide rails 34 included in the left sets of motion-sickness mitigation system 16 are arranged to lie on the same plane. Additionally, the upper curvilinear guide rails 34 included in the left sets of motion-sickness mitigation system 16 are arranged to lie on the same curve such that they share a common origin relative to one another. Similarly, the upper curvilinear guide rails 34 included in the right sets of motion-sickness mitigation system 16 are also arranged to lie on the same plane and curve such that they share a common origin relative to one another. However, in other embodiments, left and right upper guide rails may not be arranged to lie on the same plane and curve nor share a common origin, respectively.

The arrangement of the lower curvilinear guide rails 32 and the upper curvilinear guide rails 34 may be interchangeable. For example, fore and aft extending lower guide rails 32 included in left and right motion controllers 15 may be used. Similarly, laterally extending upper guide rails 34 included in front and rear motion controllers 15 may be used.

A method of using occupant support 10 includes a number of steps. In a first step, seat mount 12 and seat 14 are provided and the seat 14 is biased towards the equilibrium state. In a second step, seat 14 is moved relative to seat mount 12 from a first position to a second position in response to an acceleration of seat mount 12 during acceleration of seat mount 12. The second step may include translating seat 14 relative to seat mount 12. The second step may include tilting seat 14 relative to seat mount 12. The second step may further include rotating the seat 14 relative to the seat mount 12 about a common origin. The method may further include a third step of returning the seat 14 to the equilibrium state after the acceleration of seat mount 12 is removed.

In illustrative embodiments, a motion-sickness mitigation system may be used with a vehicle seat to minimize motion sickness experienced by an occupant resting on the vehicle seat. The motion-sickness mitigation system may include one or more gravity dampers (or G dampers). FIG. 4 is a diagrammatic view showing a body of an occupant counterbalances within a vehicle moving in the opposite direction. FIG. 5 is a diagrammatic view showing inertial force experienced by an occupant that is accelerating in an occupant support.

Motion sickness is a condition which may include a number of associated symptoms. The rise of autonomous vehicles may lead to an increase in the number of occupants that experience motion sickness. Many activities unrelated to driving may have a worsening effect on the frequency and severity of motion sickness symptoms. For example, motion sickness may occur when attempting to read or watch screen content while moving. It is desired to address motion sickness and minimize or eliminate the effects of its symptoms.

Various symptoms of motion sickness that may be alleviated by one or more embodiments of the present disclosure include cold sweating, increased salivation, pallor (skin color), drowsiness, headache, severe pain, nausea, vomiting, and sopite syndrome (which includes profound drowsiness and persistent fatigue which may result in hours or days of boredom, apathy, increased irritability, and personality changes). The symptoms mentioned above may have a response dependent upon the provocativeness of stimulation, relative susceptibility of the person, and prior experiences.

Results from motion sickness field testing show an abrupt duration of less than two seconds in changes of x-G forces and y-G forces. G force loading was less than 1 G in each axis with rapid combined x-G forces and y-G forces provoking motion sickness within two seconds. Each test subject experienced high motion sickness for about half of the testing time and each subject noted that they would not have continued reading as long as they did during the test. An S-curve including slight rolling hills through a dark tunnel provoked motion sickness in some cases. Test subjects experienced some level of residual motion sickness symptoms following testing.

The present disclosure provides systems to mitigate or eliminate motion sickness by reducing the effects of acceleration or deceleration and reducing or controlling vehicle vibration levels either within the vehicle suspension or within the seating system. A gravity damper (or G damper) system may provide partial car motion cancellation relative to the occupant, may absorb inertial forces to provide a constant state to the body of occupant, and may reduce or override uncomfortable vibrations that may result in motion sickness.

Anyone may be vulnerable to the effects of motion sickness. It may occur even for blind people that experience visual or other sensory-dependent adaptation to the moving environment. Although complex interactions may not be fully understood because there are significant individual variations, there may be vestibular inputs and visceral inputs due to motion, and there may be a relationship between the head and the corresponding torso movements of a person. The sensory conflict theory provides that motion sickness may be caused by a discrepancy between the expected and actual sensory feedback. The sensory conflict theory may be the most widely-accepted theory and differentiates between somatic (muscles and joints) and visceral (gut) receptors which may act as biological accelerometers.

The suspension system for mitigating motion-sickness is based on Newton Laws of Motion. When a force is applied on a freely moving object in order to accelerate, decelerate, or change its direction, an equal inertial force acts on the object in an opposite direction of the applied force. An occupant can experience or feel that inertial force, which is an indicator of motion for their vestibular system.

The inertial force is proportional to the acceleration, so reducing the acceleration decreases the inertia force. Decoupling the occupant support from the rest of the vehicle, may allow it to freely move in the opposite direction of the vehicle acceleration, thus reducing the acceleration sustained by the occupant body and as a result the inertial force and the perception of motion. Following this principle, this disclosure may enable the occupant support to have a certain degree of free motion relatively to the vehicle frame, to enable it to move in the opposite direction of the vehicle acceleration.

This degree of free motion may be controlled via some dampening solution, to avoid an abrupt stop when reaching the limit of the free motion. The direction of free motion may also be controlled to maximize the occupant stability during the movement. Enabling the occupant body to describe the trajectory of a pendulum may create a centrifugal force (perpendicular to the inertial force), promoting stability.

The present disclosure is related to motion sickness mitigation integrated into a vehicle seat. The occupant support 10 may provide selective dampening of the occupant support 10 using components of the base connected to the vehicle floor. The occupant support 10 may include at least one foot, a sensor system, and electronic means. The at least one foot may include a curvilinear rail and a set of rollers adapted to connect the seat base to the vehicle floor. The sensor system may be adapted to connect to a vehicle kinematics system for receipt of vehicle kinematics data. The electronic means may be adapted to connect the sensor system to the foot and transfer the data to and from the controller. The controller may be adapted to connect to the sensor system for selective gravitational dampening of the foot based on data received by the sensor system.

The invention claimed is:

1. An occupant support for use in a vehicle, the occupant support comprising
a seat adapted to support an occupant above a floor of the vehicle, the seat including a seat bottom, a seat back that extends upwardly away from the seat bottom, and a seat base coupled to the seat bottom for movement with the seat bottom, a seat mount adapted to couple to the floor of the vehicle for movement with the vehicle, and a motion-sickness mitigation system configured to allow the seat to move relative to the seat mount in response to an acceleration of the seat mount, the motion-sickness mitigation system including a plurality of motion controllers coupled to the seat and the seat mount, and each motion controller includes a lower curvilinear guide rail coupled to the seat mount, a upper curvilinear guide rail coupled to the seat base, and a slide unit, wherein the slide unit is coupled to the lower curvilinear guide rail and the upper curvilinear guide rail to allow relative movement between the lower curvilinear guide rail and the upper curvilinear guide rail in response to the acceleration of the seat mount to allow the seat to move relative to the seat mount and minimize a magnitude of an acceleration experienced by the occupant so that motion sickness of the occupant is minimized.

2. The occupant support of claim 1, wherein the lower curvilinear guide rail defines a first curvilinear path and the seat is free to rotate relative to the seat mount in a first direction and a second direction along the first curvilinear path.

3. The occupant support of claim 2, wherein the upper curvilinear guide rail defines a second curvilinear path and the seat is free to rotate relative to the seat mount in a third direction and a forth direction along the second curvilinear path.

4. The occupant support of claim 3, wherein the seat is free to rotate simultaneously along the first and second curvilinear paths in response to the acceleration of the seat mount.

5. The occupant support of claim 1, wherein the slide unit includes a first roller coupled to the lower curvilinear guide rail, a second roller coupled to the upper curvilinear guide rail, and a shaft extending from the first roller to the second roller.

6. The occupant support of claim 5, wherein the lower curvilinear guide rail includes a housing and a biasing member located in the housing and the upper curvilinear guide rail includes a housing and a biasing member located in the housing.

7. The occupant support of claim 6, wherein the biasing member located in the lower curvilinear guide rail is coupled to the slide unit.

8. The occupant support of claim 1, wherein the lower curvilinear guide rail is about perpendicular to the upper curvilinear guide rail.

9. An occupant support comprising
a seat,
a seat mount adapted to couple to a floor of a vehicle, and
a motion-sickness mitigation system coupled to the seat and the seat mount and configured to allow rotation of the seat relative to the seat mount in response to an acceleration of the seat mount.

10. The occupant support of claim 9, wherein the motion-sickness mitigation system includes a motion controller coupled to the seat and the seat mount, the motion controller includes a first guide rail, a second guide rail, and a slide unit coupled to the first guide rail and the second guide rail to allow relative movement between the first guide rail and the second guide rail in response to the acceleration of the seat mount.

11. The occupant support of claim 10, wherein the first guide rail is oriented generally perpendicular to the second guide rail.

12. The occupant support of claim 10, wherein the first guide rail defines a lower curvilinear path for the slide unit to move along and the second guide rail defines a upper curvilinear path for the slide unit to move along.

13. The occupant support of claim 12, wherein the slide unit includes a first roller located in the first guide rail and configured to move relative to the first guide rail along the lower curvilinear path and a second roller located in the second guide rail and configured to move relative to the second guide rail along the upper curvilinear path.

14. The occupant support of claim 10, wherein the first guide rail includes a housing and a biasing member located in the housing and at least a portion of the slide unit is located in the housing and coupled with the biasing member.

15. The occupant support of claim 9, wherein the motion-sickness mitigation system includes a plurality of motion controllers coupled to the seat and the seat mount and each motion controller includes at least one guide rail coupled to one of the seat mount and the seat and a slide unit configured to allow relative movement between the at least one guide rail and the other of the seat mount and the seat.

16. The occupant support of claim 9, wherein the motion-sickness mitigation system includes at least four guide rails coupled to the seat and the at least four guide rails are spaced apart from one another.

17. The occupant support of claim 16, wherein the motion-sickness mitigation system is configured to allow the seat to rotate relative to the seat mount in a first direction and in a second direction generally perpendicular to the first direction.

18. A method comprising
providing a seat mount and a seat coupled to the seat mount,
biasing the seat toward an equilibrium state;
accelerating the seat mount, and
moving the seat relative to the seat mount in response to accelerating the seat mount.

19. The method of claim 18, wherein moving the seat includes rotating the seat relative to the seat mount.

20. The method of claim 18, further comprising returning the seat to the equilibrium state after the seat mount is no longer accelerated.

* * * * *